(No Model.) 3 Sheets—Sheet 1.

C. BUCH & W. BROSE.
SPIRIT HEATING AND COOKING APPARATUS.

No. 439,772. Patented Nov. 4, 1890.

(No Model.) 3 Sheets—Sheet 2.

C. BUCH & W. BROSE.
SPIRIT HEATING AND COOKING APPARATUS.

No. 439,772. Patented Nov. 4, 1890.

Witnesses:
Wm H. Wagner
A. Joughmans

Inventors:
C. Buch & W. Brose
by their attorneys
Roeder & Briesen (No Model.) 3 Sheets—Sheet 3.

C. BUCH & W. BROSE.
SPIRIT HEATING AND COOKING APPARATUS.

No. 439,772. Patented Nov. 4, 1890.

Witnesses:
Wm Wagner
A Longhman

Inventors:
C. Buch & W. Brose
by their attorneys
Roeder & Briesen

UNITED STATES PATENT OFFICE.

CARL BUCH AND WILHELM BROSE, OF KEULA, NEAR MUSKAU, GERMANY.

SPIRIT HEATING AND COOKING APPARATUS.

SPECIFICATION forming part of Letters Patent No. 439,772, dated November 4, 1890.

Application filed September 16, 1889. Serial No. 324,273. (No model.)

*To all whom it may concern:*

Be it known that we, CARL BUCH and WILHELM BROSE, both subjects of the King of Prussia, residing at Keula, near Muskau, Silesia, Kingdom of Prussia, German Empire, have invented a new and Improved Spirit Heating and Cooking Apparatus, of which the following is a specification.

Our invention relates to an improved spirit heating and cooking apparatus in which the spirit flask or fountain or reservoir is adjustably arranged in such a manner as to allow of varying the level of the fluid within the step-shaped burner, according to the requirements, and thereby to adjust the size of the flame, as desired.

Figure 1:
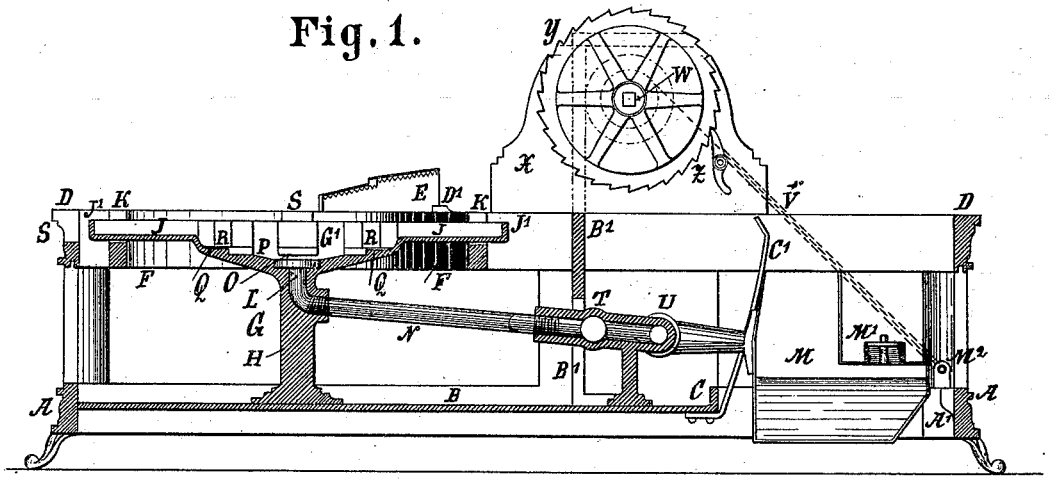
Figure 2:
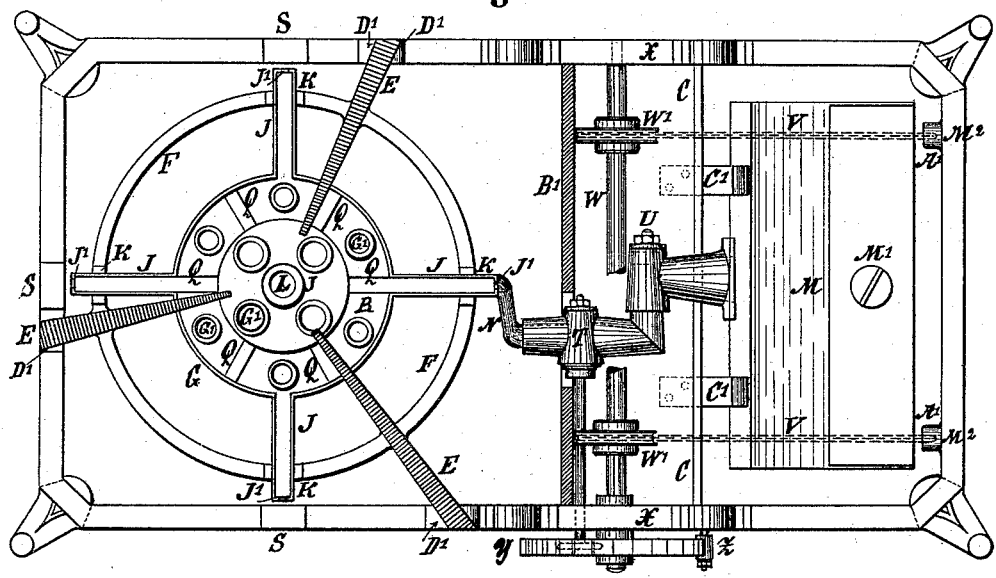
Figure 3:
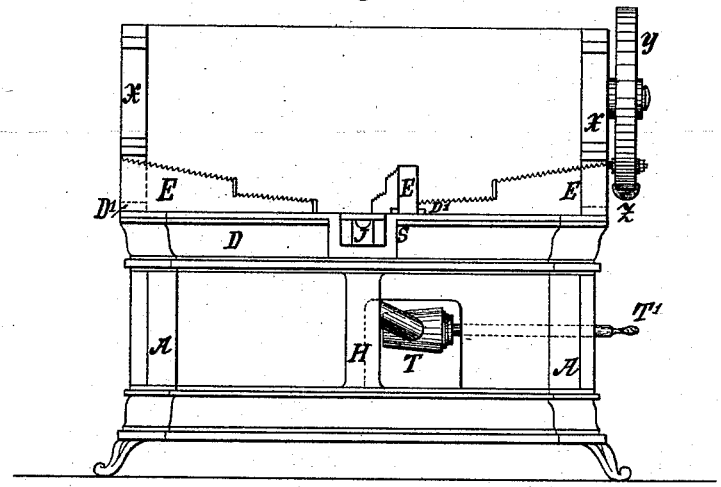
Figure 4:
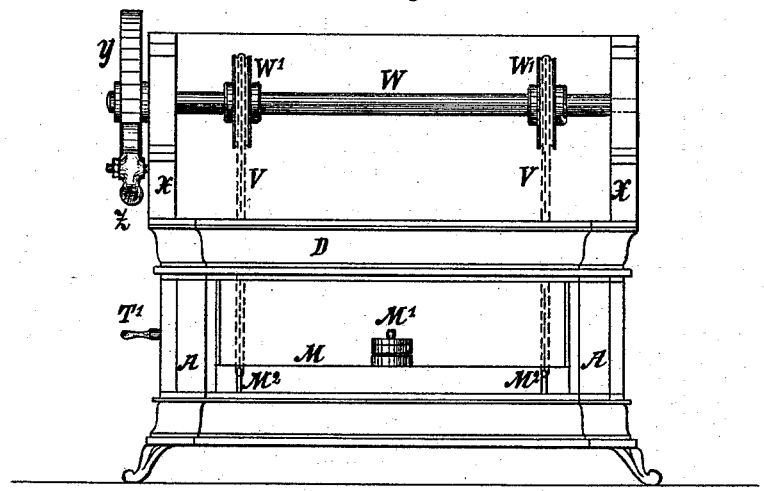
Figure 5:
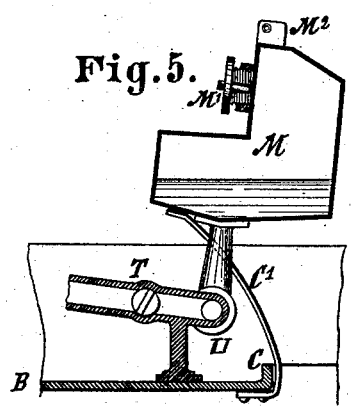
Figure 6:
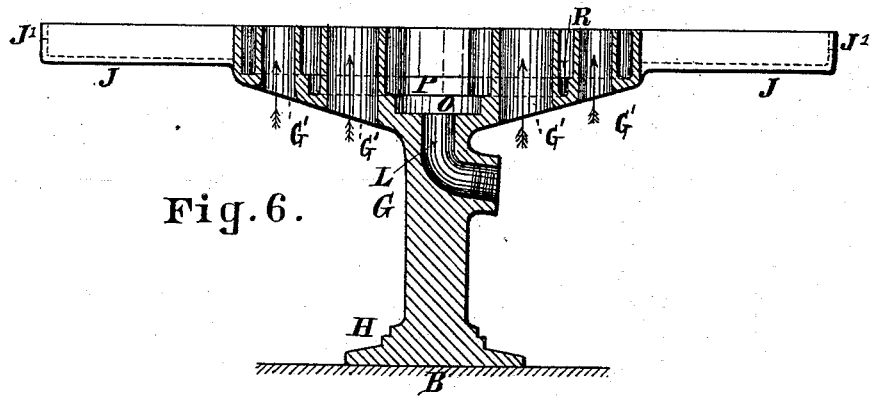
Figure 7:
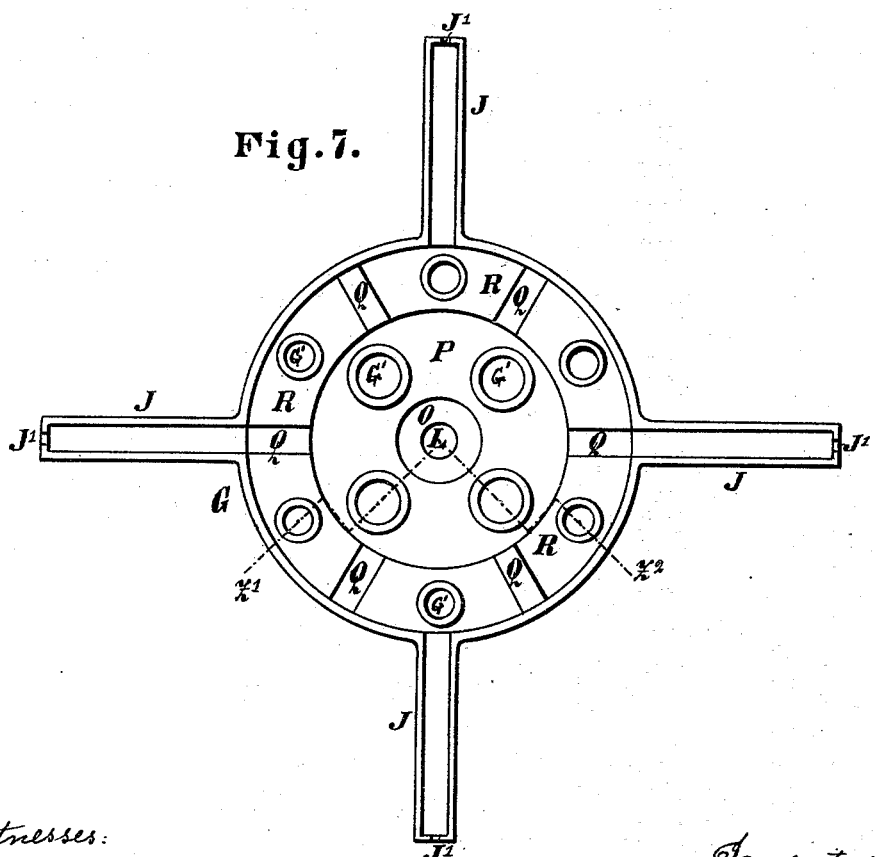

In the accompanying drawings, Figure 1 is a longitudinal section of the spirit heating apparatus embodying the improvements of our invention. Fig. 2 is a plan of the same. Figs. 3 and 4 are respectively an end view and a front view of the same. Fig. 5 is a sectional view of the spirit-flask in its elevated position. Fig. 6 is a detail vertical central section of the burner G, and Fig. 7 a top view thereof.

The skeleton frame A of the apparatus may conveniently be carried by suitable supporting-feet. The bottom B, provided with a cross-web C, forms a basin or open reservoir to collect the spirit which may trickle down from the burner. The upper part D of the frame is secured within a groove of the lower part A, and upon suitable brackets D' of this upper part D the supporting-ring F, with three step-shaped webs or ribs E, is carried to receive the pots, pans, and vessels to be heated. Within the supporting-ring F the burner G is arranged, having its foot or base H resting on the bottom B, and having its four safety-channels J resting loosely within four corresponding recesses K of the ring F.

The burner G has a central hole L, within which the spirit coming from the flask or fountain through the connecting-pipe N will rise and enter, first, into the first step or stage O, thence into the second step or stage P, then into the six narrow recesses Q of the third step or stage R, which recesses being filled up will show that the second stage is completely filled up, and, finally, the spirit will fill up also the third stage R of the burner G and enter into the safety-channels J, which may be observed through the recesses K of the ring F. At the outer and upper ends of the four said safety-channels J small recesses J' are provided to allow drops of the spirit to fall down. Attention is thereby called to the fact that the burner is filled up before even the fluid will overflow the top of the burner. The said channels J may equally serve as a balance in adjusting the apparatus in a horizontal position.

As the pots, pans, or vessels to be heated will generally have a diameter fitting to the supporting-webs, the distance between the several webs or ribs E, or the vessels supported by the same, and the corresponding step or stage of the burner G or the flame will always be the same. At three sides of the upper portion D of the frame spy-holes S are provided, which permit observation of the level of the spirit on the burner G while the vessel is put on.

Within the burner G a considerable number of tubes G' are vertically arranged for the purpose of feeding atmospheric air to the flame.

The inclined feeding-tube N connects the base of the burner G with the valve-box, the base of which rests on the bottom B. The valve T serves to shut off the spirit from the burner G to avoid evaporation. At one side of said valve T a handle T' is secured, and at right angles to said handle a pivot U is secured within the spirit flask or fountain M. The said flask or fountain M is of an angular shape, and is filled through an orifice M' with a screw-cap. Two projecting arms $M^2$ of the flask are arranged opposite two corresponding brackets A' of the frame A to rest upon the same.

The flask or reservoir M is suspended by chains V to pinions W' W' on a square shaft W, carried in bearings of suitable standards X. On the outside end of said shaft W a ratchet-wheel Y is mounted, being held in position by a pawl Z. On turning said wheel Y from the right to the left the chains V are wound upon the pinions W' and the flask M is lifted. Accordingly the spirit contained in the flask and normally filling the same up to the orifice M' will flow down through the pipe N into the burner G. The more the flask M is lifted the more the level of the spirit will rise within the burner. Finally the flask will come into the position shown in Fig. 5. If then the whole of the contents of the flask has been consumed by the flame, the discharge-orifice of the flask M will be on the same level with the overflow or upper end of the bore L of the burner G and the flame will be extinguished. If the spirit in the burner fills the first step O only, water previously brought to the boiling-point can be kept at such boiling-point. If all the steps of the burner are filled with spirit, three liters of water may be made to boil within fifteen minutes. To secure the descent of the empty flask M, springs C', carried by the ribs C, are arranged to bear against said flask M. By pressing the pawl Z out of engagement with the wheel Y and by turning the wheel Y back the flask M may be made to return into its former position, as shown in Fig. 1. The spirit filling the flask up to the screw-cap M' cannot enter into the pipe N while the flask remains in its lowest position. It may be easily seen, then, that by making the flask M descend the flame will immediately be extinguished, because the spirit will at once flow back within the burner.

To protect the flask or reservoir M against the heat from the burner G, a vertical shield B' of sheet metal may be erected on the bottom B, having its upper end bent in a manner to deflect the heat.

Having now particularly described and ascertained the nature of our said invention and in what manner the same is to be performed, we declare that what we claim is—

1. The combination of a step-shaped burner having channels J with a pivoted reservoir M, a pipe connecting the burner with the reservoir, chains V, pinions W', shaft W, ratchet-wheel Y, and pawl Z, for tilting the reservoir, substantially as specified.

2. The combination of a step-shaped burner G with a pivoted reservoir M and a pipe N, for connecting the burner with the reservoir, substantially as described.

In testimony whereof we hereunto sign our names, in the presence of two subscribing witnesses, this 17th day of August, 1889.

CARL BUCH.
WILHELM BROSE.

Witnesses:
 GEO. H. MURPHY,
 F. VON VERSEN.